United States Patent [19]
Sato

[11] Patent Number: 5,459,646
[45] Date of Patent: Oct. 17, 1995

[54] LEVELING DEVICE FOR VEHICULAR HEADLAMP

[75] Inventor: Masakazu Sato, Shizuoka, Japan

[73] Assignee: Koito Manufacturing Co., Ltd., Tokyo, Japan

[21] Appl. No.: 299,601

[22] Filed: Sep. 1, 1994

[30] Foreign Application Priority Data

Sep. 3, 1993 [JP] Japan .................... 5-219742

[51] Int. Cl.⁶ .................................................. F21M 3/20
[52] U.S. Cl. .................. 362/66; 362/271; 362/428; 362/284; 362/283; 362/324; 362/420; 362/289
[58] Field of Search ............... 362/66, 420, 284, 362/289, 324, 419, 272, 61, 80, 273, 269, 275, 283, 319, 421, 428, 233, 424, 422

[56] References Cited

U.S. PATENT DOCUMENTS

| | | |
|---|---|---|
| 4,984,136 | 1/1991 | Yamagishi et al. .......... 362/66 |
| 5,016,155 | 5/1991 | Chevance ..................... 362/418 |
| 5,029,051 | 7/1991 | Shirai et al. ................... 362/66 |
| 5,067,056 | 11/1991 | Suzuki et al. ................. 362/66 |
| 5,077,642 | 12/1991 | Lisak ............................. 362/66 |
| 5,121,303 | 6/1992 | Shirai et al. ................... 362/61 |
| 5,138,532 | 8/1992 | Shirai et al. ................... 362/66 |
| 5,363,283 | 11/1994 | Shirai et al. ................... 362/66 |

*Primary Examiner*—Ira S. Lazarus
*Assistant Examiner*—Thomas M. Sember
*Attorney, Agent, or Firm*—Sughrue, Mion, Zinn, Macpeak & Seas

[57] ABSTRACT

An automobile headlamp in which an illumination angle of the headlamp can be adjusted laterally by pivoting a reflector right to left with respect to a lamp body. A leveling device for measuring the lateral inclination of a reflector is held between the reflector and a lamp body. The leveling device includes tubular holders which are fixedly fitted into the holder fitting hole of the lamp body and extend longitudinally, a sliding rod which is slidably fitted into the holder, has its leading end urged to abut against the rear side of the reflector and slides in the holder in association with the inclination of the reflector, and graduations provided between the sliding rod and the holder. Flanges are formed on the holder by fixing them to the peripheral edge of the holding fitting hole with screws, whereas vertical walls are formed at the peripheral edge of the holder fitting hole of the lamp body. The vertical walls engage the respective flanges in the peripheral direction and surround the holders.

18 Claims, 5 Drawing Sheets

LEVELING DEVICE FOR VEHICULAR HEADLAMP

BACKGROUND OF THE INVENTION

The present invention relates to a leveling device for use in measuring the direction of illumination in the lateral direction of a vehicular headlamp to allow a determination to be made as to whether or not the illumination angle in the lateral direction of the headlamp is within a proper range. More particularly, the invention relates to a leveling device for measuring an amount of lateral inclination of a vehicular headlamp so that the illumination angle of the headlamp can be properly adjusted in the lateral direction thereof when the angle is outside the proper range.

A description will herein be given of a headlamp of a movable-reflector type automobile headlamp by way of example, in which type a reflector is tiltably mounted in a lamp body. FIG. 1 shows an example of a headlamp this type. As shown in FIG. 1, a reflector 2 is supported at three points with respect to a lamp body 1, namely, by two aiming screws 3 and 4, and one fulcrum 5 of a ball joint structure. (The aiming screws 3 and 4 extend perpendicular to the plane of FIG. 1.) The aiming screws 3 and 4 are rotatably retained in the rear wall of the lamp body 1. The points at which the reflector 2 is supported by the aiming screws 3 and 4 are arranged, for example, at right angles with respect to the pivot fulcrum 5 as viewed from the front of the lamp. The aiming screws 3 and 4 are turned to cause the reflector to pivot about the horizontal axis Lx and the vertical axis Ly, respectively, in order to adjust the illumination angle of the headlamp. Reference numeral 6 denotes a bulb provided as a light source which is mounted on the reflector 2.

On the other hand, in the case of a movable-unit type headlamp (not shown), an integrally combined lamp body and reflector unit is pivotably mounted with respect to a lamp housing of the body of the vehicle. In this case, the reflector surface is integrally formed on the inner peripheral face of the lamp body. The unit is tiltably mounted by one pivot fulcrum and two aiming screws so as to be tiltable with respect to the housing, similar to the case of the movable-reflector type headlamp of FIG. 1. The aiming screws are turned to make the unit pivot in order to adjust the illumination angle of the headlamp.

In automobile headlamps such as those described above, the movable member (i.e., the reflector in the movable-reflector type headlamp or the unit in the movable-unit type headlamp) the illumination direction of the lamp is adjusted vertically (by pivotal movement about the horizontal axis Lx) and laterally (by pivotal movement about the vertical axis Ly) with respect to a reference member (i.e., the lamp body in the movable-reflector type headlamp and the housing in the movable-unit type headlamp) by turning the two aiming screws to adjust the irradiating angle of the lamp.

Recently, various leveling devices for measuring the illumination angle in the lateral direction of a lamp have been proposed. For example, co-assigned U.S. Pat. No. 5,067,056 discloses such a leveling device which includes, as shown in FIG. 2, a tubular fixed holder a fixedly fitted into a hole 1a formed in the back wall of a lamp body 1, a movable holder b screwed into the fixed holder a, a sliding rod c passing through the movable holder b in such a way that its leading end abuts against the back side of a reflector 2 while being urged thereagainst, and relative graduations $d_1$ and $d_2$ provided between an extension of the movable holder b at the rear of the lamp body. The lateral inclination of the reflector, that is, the lateral illumination angle of the headlamp, can be measured from the amount of misalignment between the graduations $d_1$ and $d_2$ between the holder b and the sliding rod c.

However, the holder b in the aforementioned leveling device projects rearward from the lamp body 1 a conspicuous amount as it is necessary for the assembly worker to read the graduations $d_1$ and $d_2$ by looking at the leveling device projecting from the back of the lamp body from a vantage point above the headlamp while the headlamp is mounted on the vehicle body. For this reason, sometimes an object may bump against the holder b and damage the leveling device when the headlamp incorporating the leveling device is mounted on the vehicle body. Although flanges e formed on the fixed holder a are fixed to the lamp body 1 with screws when the leveling device is fitted to the headlamp, the work of fixing the flanges takes time because the positioning of the fixed holder a in the peripheral direction is quite difficult.

SUMMARY OF THE INVENTION

The present invention was made in view of the foregoing problems accompanying the conventional leveling device. Accordingly, an object of the present invention is to provide a leveling device for a vehicular headlamp that can be readily fitted to the headlamp with the least effort and without damage.

In order to accomplish the above and other objects, there is provided a leveling device for a vehicular headlamp of a type having a tiltable member wherein an inclination member having a light reflective surface for setting an illumination direction of the lamp is pivotably supported on the vertical axis with respect to a reference member, wherein the lateral illumination angle of the headlamp can be adjusted by pivotally moving the inclination member in the lateral direction with respect to the reference member, the headlamp including a leveling device which is positioned between the inclination member and the reference member and is used for measuring the amount inclination of the inclination member in the lateral direction, the leveling device including: a tubular holder which is fixedly fitted into a holder fitting hole formed in the reference member from the rear thereof and extending through the holder fitting hole; a sliding rod which is slidably fitted into the holders has a leading end extending forward from the holder, and is urged into abutment with the rear side of the inclination member, the sliding rod being caused to laterally slide in the holder in association with pivotal movement of the inclination member; and relative graduations provided between the extension of the sliding rod at the rear of the reference member and the holder, wherein the holder is provided with a plurality of flanges in abutment with the peripheral edge of the holder fitting hole, and wherein vertical walls engaging the flanges in the peripheral direction and surrounding the holder are formed at the peripheral edge of the holding fitting hole of the reference member.

The pivotally moving member pivots laterally (about the vertical axis) with respect to the reference member, and the sliding rod longitudinally slides along the holder in association with the pivotal movement. The lateral pivoting movement of the pivotally moving member with respect to the reference member is proportional to the sliding movement of the sliding rod with respect to the holder, and the inclining movement of the pivotally moving member with respect to the reference member, that is, the amount of lateral shift of the illumination angle of the headlamp, appears as a corresponding variation in the relative graduations between the sliding rod and the holder. Consequently, it is possible to determine whether the lateral illumination angle of the headlamp is proper or not, and to determine the amount of deviation if the angle is improper. Moreover, the deviation can be corrected by adjusting the relative graduations to the zero point.

Further, the vertical walls surrounding the holder prevent objects from directly bumping into the holder. Moreover, the flanges of the holder peripherally engage the vertical walls so as to position the holder in the peripheral direction.

DESCRIPTION OF THE PREFERRED EMBODIMENTS

Referring to the accompanying drawings, preferred embodiments of the present invention will be described with reference to accompanying drawings.

Figure 1:
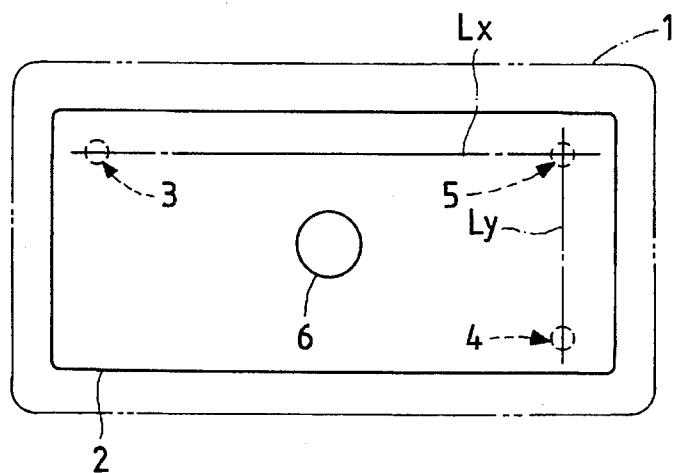
FIG. 1 is a schematic front view of a conventional headlamp.
Figure 2:
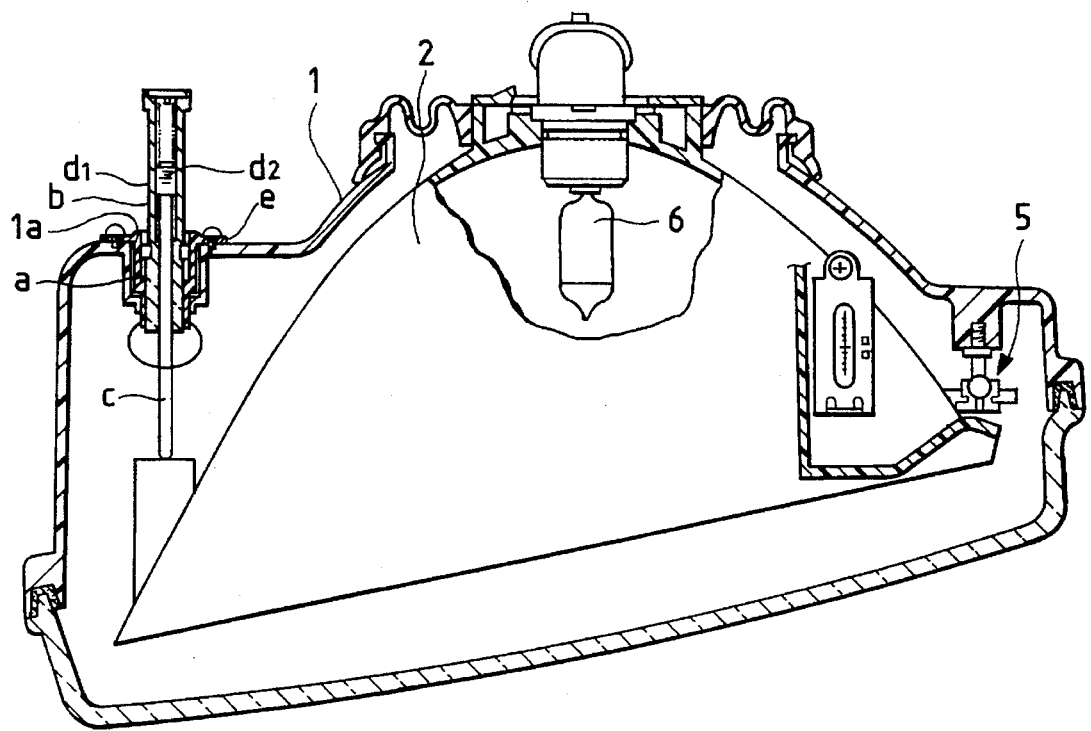
FIG. 2 is a horizontal sectional view of another conventional headlamp.
Figure 3:
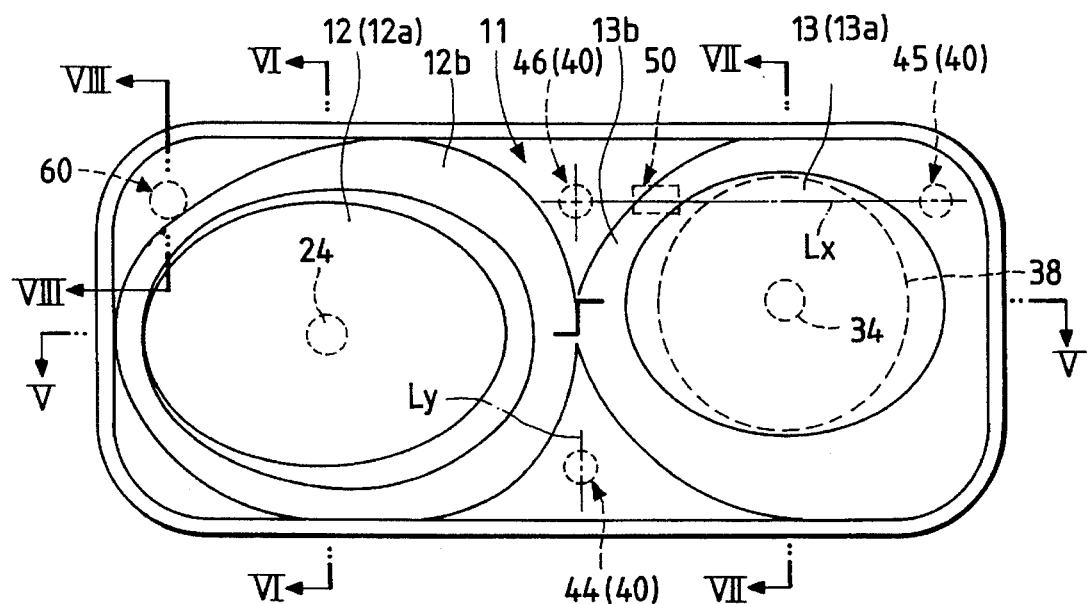
FIG. 3 is a front view of a movable-reflector type headlamp incorporating a leveling device.

FIGS. 3 to 8 illustrate a case where the present invention is applied to a movable-reflector type headlamp, which has a lamp body as a reference member and a reflector as the pivotally movable member. FIG. 3 is a front view of a movable-reflector type headlamp incorporating a leveling device, FIG. 4 a rear view of the headlamp, FIG. 5 a horizontal sectional view of the headlamp taken along a line V—V in FIG. 3, FIG. 6 a vertical sectional view of the headlamp taken along a line VI—VI in FIG. 3, FIG. 7 a vertical sectional view of the headlamp taken along a line VII—VII in FIG. 3, and FIG. 8 an enlarged vertical sectional view of a leveling device for measuring the inclination angle of illumination in the longitudinal direction of the headlamp taken along a line VIII—VIII in FIG. 3.

A cup-shaped lamp body 10 has a rectangular opening on its front side. The lamp body 10 houses therein a reflection-type lamp 20 and a projection lamp 30, which are arranged side-by-side. A front lens 40 covers the front opening of the lamp body 10.

The reflection-type lamp 20 includes a parabolic reflector 22 and a bulb 24 mounted through a bulb hole in the reflector 22. The light emitted from the bulb 24 is reflected by the reflector 22 and converted to a substantially parallel beam whose directions of emission are controlled by light-distribution control steps formed on the rear face of the front lens 11, whereby a main beam distribution pattern is formed.

The projection type lamp 30 includes a substantially elliptical reflector 32, a bulb 34 mounted through the bulb hole of the reflector 32 and fixed at the first focal point of the reflector 32, a tubular lens holder 36 fixed to the front opening of the reflector 32 and incorporating a shade 37 extending to the second focal point of the reflector 32, and a projection lens 38 secured to the lens holder 36. The above components are combined in one body, whereby a sub-beam distribution pattern having a clear-cut line corresponding to the shade 37 is formed.

A tongue-like horizontal extension 37a is formed on the central front side in the width direction of the shade 37. As shown by an arrow in FIG. 7, the horizontal extension 37a functions as a blocking member which blocks off useless reflected light emitted diagonally and downward in front of the lamp 30, and which would strike a body component 16 before being reflected upward therefrom.

The lamps 20 and 30 are integrally combined together by means of an attachment member 42 extending longitudinally therebetween. The attachment member 42 is tiltably and movably supported with respect to the lamp body 10 by an aiming mechanism 40 (see FIG. 3) including two aiming screws (a vertical aiming screw 44 and a lateral aiming screw 45) and one ball joint 46. More specifically, the aiming screws 44 and 45, which pass through the rear wall of the lamp body and extend forwardly, are rotatably supported at the rear of the lamp body 10. Each of the aiming screws 44 and 45 is arranged such that its leading end is screwed into a nut (not shown) fitted to the attachment member 42. Further, the ball joint 46 is installed between the rear wall of the lamp body 10 and the attachment member 42. By turning the aiming screw 44, the attachment member 42 is caused to pivot vertically around the horizontal Lx, whereas by rotating the aiming screw 45, the lamps 20 and 30 are caused to pivot laterally together around the vertical axis Ly. In other words, the optical axes of the lamps 20 and 30 can be adjusted in the vertical and lateral directions.

A linear bubble tube type level 50 (see FIGS. 3 and 5), acting as a level for measuring the vertical inclination of the lamps 20 and 30, is fixed to the attachment member 42. Further, a transparent observation window 52 is provided in the upper wall surface of the lamp body above the level 50, so that the inclination quantity in the vertical direction of the lamps 20 and 30 can be readily ascertained by reading the inclination quantity of the level 50 through the observation window 52. When the bubble is shifted from the zero point (i.e., when the lamps 20 and 30 are vertically inclined from their proper position), the inclination can be corrected by turning the aiming screw 44.

Moreover, a leveling device 60 for measuring the amount of lateral inclination of the lamps 20 and 30 is mounted between the lamp body 10 and the attachment member 42. More specifically, the leveling device 60 includes a tubular fixed holder 62 fitted into a tubular externally projecting portion 61 integrally formed on the rear wall of the lamp body 10 and longitudinally extending, a tubular transparent movable holder 66 for measuring the zero point, which is screwed into the fixed holder 62 and extends longitudinally, a sliding rod 70 passing through the movable holder 66 in such a way as to be longitudinally slidable, a compression coil spring 74 which is housed in the movable holder 66 and urges the sliding rod 70 in a direction in which the sliding rod 70 projects forward from an opening 66a at the leading end of the movable holder, indicia 67 formed on the extension at the rear of the movable holder 66, and graduations 71 which are marked on the sliding rod 70 and correspond to the indicia 67.

A holder fitting hole 61a is formed in the tubular externally projecting portion 61, and the fixed holder 62 is fitted into the holder fitting hole 61a. Further, a pair of flanges 62a formed on the fixed holder 62 are fastened with screws to a boss 61b projecting from the rear of the lamp body 10. The fixed holder 62 is thus fixed to the lamp body 10.

Figure 4:
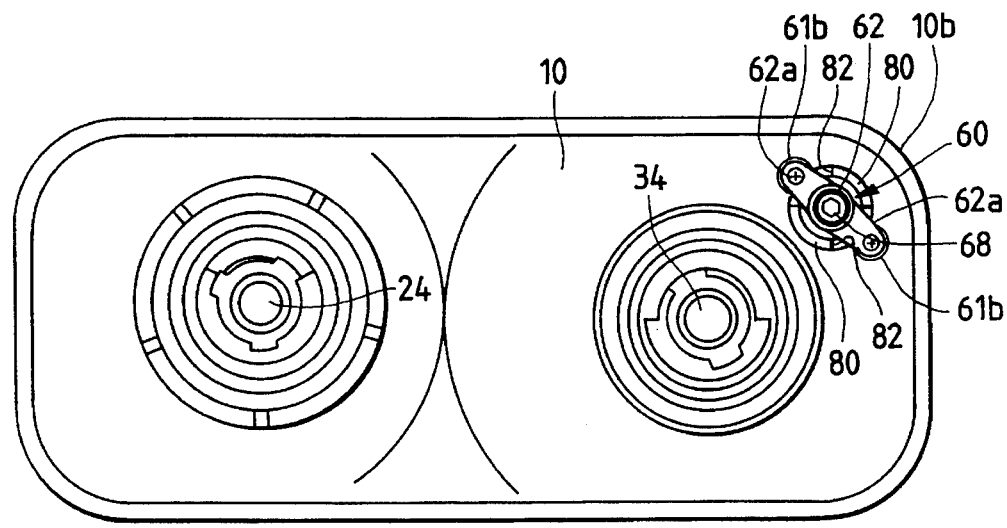
FIG. 4 is a rear view of the headlamp of FIG. 3.
Figure 5:
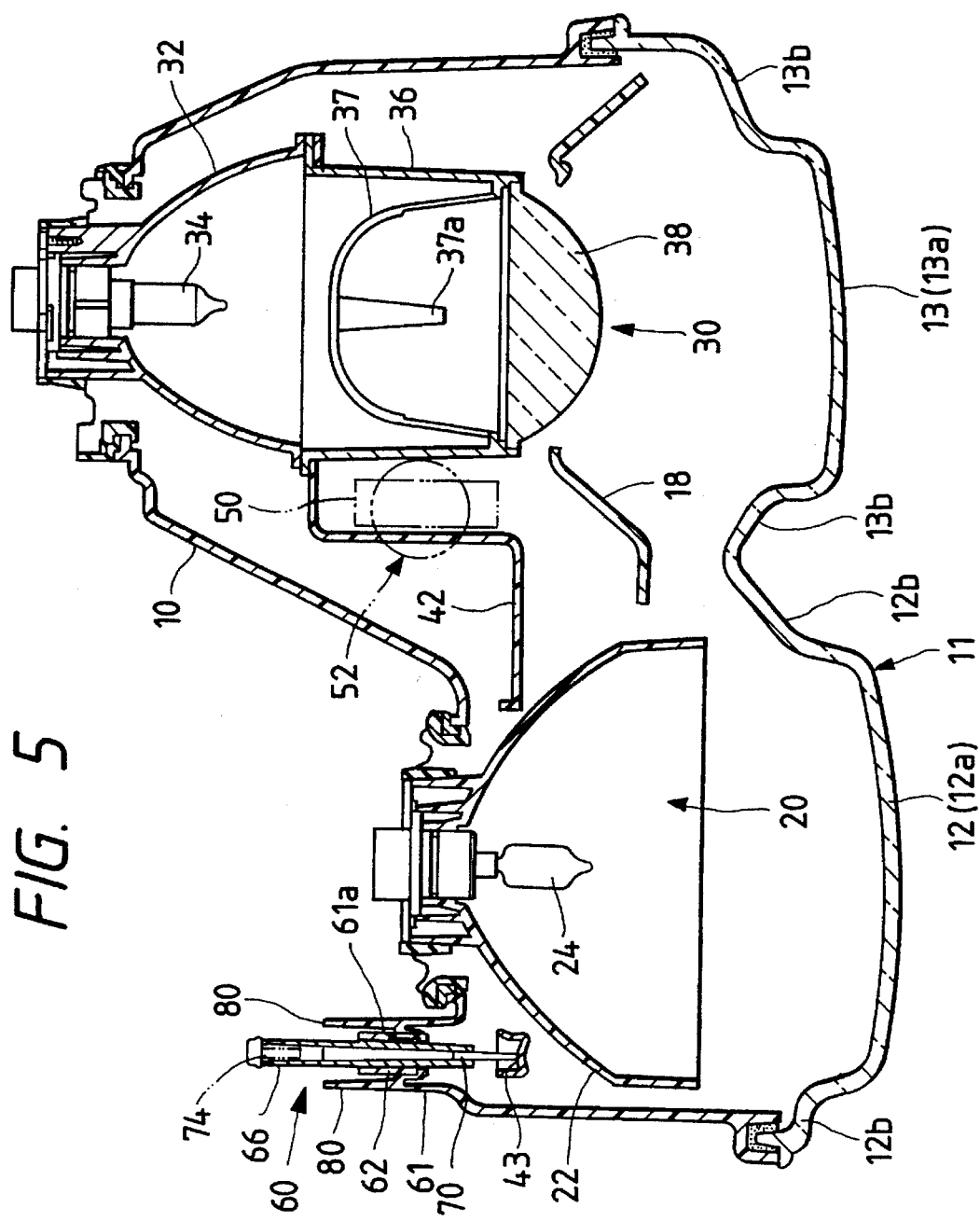
FIG. 5 is shows a horizontal sectional view of the headlamp of FIG. 3 taken along a line V—V in FIG. 3.
Figure 6:
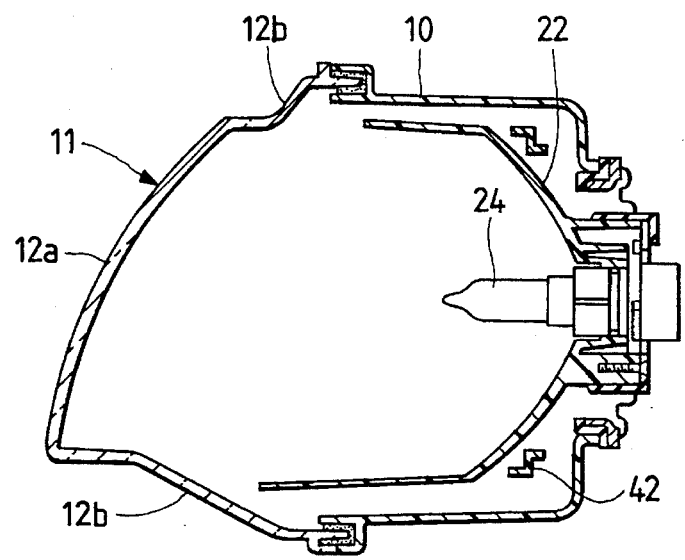
FIG. 6 is a vertical sectional view of the headlamp taken along a line VI—VI in FIG. 3.
Figure 7:
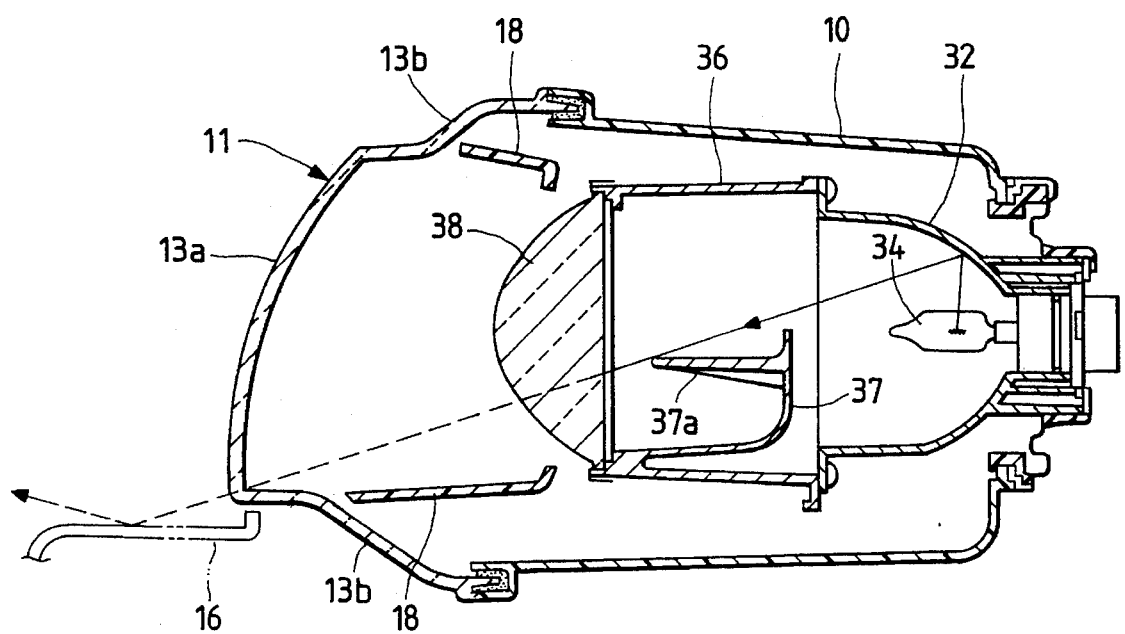
FIG. 7 is a vertical section of the headlamp taken along a line VII—VII in FIG. 3.
Figure 8:
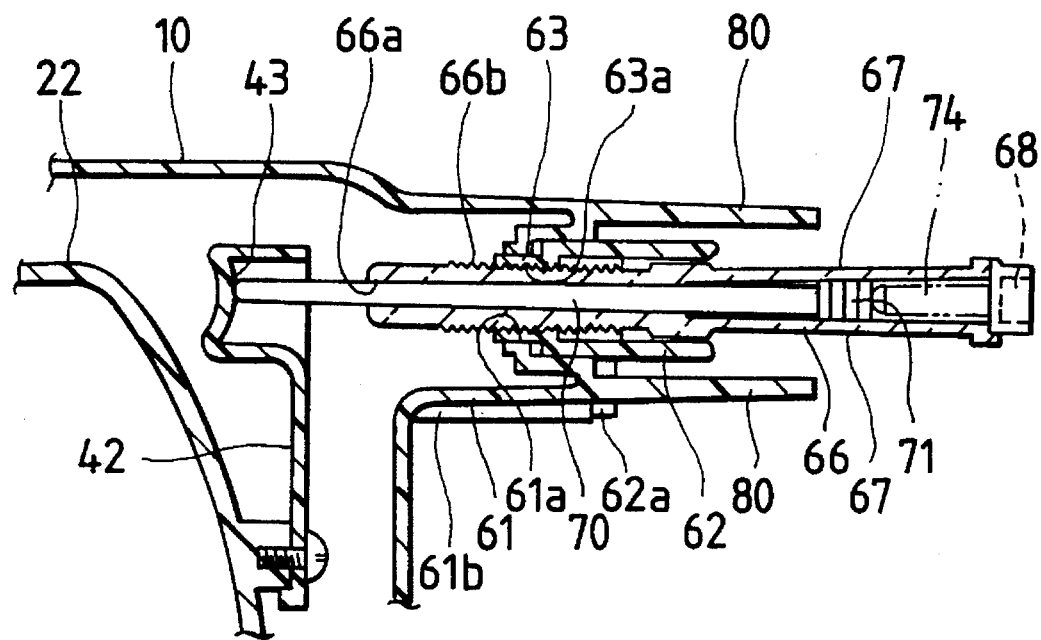
FIG. 8 shows an enlarged vertical section of a leveling device for measuring the angle of illumination in the longitudinal direction taken along a line VIII—VIII in FIG. 3.

Further, a pair of vertical walls 80 continuously extending rearward from the externally projecting portion 61 are formed at the peripheral edge of the holder fitting hole 61a. As shown in FIG. 4, the vertical walls 80 are formed by making two opposed cutouts in the periphery of a cylinder, and each flange 62a of the fixed holder 62 is fitted into a respective cutout 82 and mated therewith. In other words, the cutouts 82 of the vertical walls 80 function to position the fixed holder 62 in the peripheral direction by engaging with the flanges 62a of the fixed holder 62.

A male screw portion 66b, which is formed on the forward outer peripheral end side of the movable holder 66 made of transparent synthetic resin, is screwed into a female screw portion 63a of the small-diameter portion 63 of the fixed holder 62, whereby the movable holder 66 is caused to project a significant distance rearward from the rear wall of the lamp body. The movable holder 66 is in the form of a cylinder having a closed rear end. A mating recess 68, hexagonal in transverse cross section, is formed in the rear closed end portion of the movable holder 66, with which a movable-holder turning jig (not shown) can mate. In other words, the movable holder 66 is caused to move back and forth along the fixed holder 62 by turning the mating recess 68 by means of the jig, whereby the adjustment of the indicia 67 on the movable holder 66 with respect to the graduation 71 on the sliding rod 70, that is, the zero point adjustment, can be made.

The sliding rod 70 in the movable holder 66 is urged to project forward by the elastic force of the compression coil spring 74 so that its leading end is held in abutment against the vertical wall 43 of the attachment 42 extending along the rear of the reflector 22. The sliding rod 70 longitudinally slides in the movable holder 66 interlocked with the pivotal movement of the attachment 42 along the vertical axis Ly. The graduations formed on the sliding rod 70 are classified by color into central and remaining gradations, the indicia 67 being made to align with the central graduations in the initial setup. Thus, the lateral inclination of the lamps 20 and 30 can be read from the amount of deviation of the graduations.

The vertical walls 80 surround the rearward projecting movable holder 66. Also, the walls 80 are formed in positions corresponding to the peripheral edge 10b (see FIG. 4) at the corner of the lamp body 10. As a result, the movable holder 66 is protected from being directly struck by an object when the headlamp incorporating the leveling device is carried or fitted to the vehicle body. That is, the leveling device is protected from damage.

As viewed from the front side, elliptical regions 12 and 13 corresponding to the respective lamps 20 and 30 are formed in such a manner as to protrude forward at the respective positions of the lamps 20 and 30 at the front lens 11 to ensure the high-impact strength of the front lens 11. In other words, the front lens 11 is provided with protrusions 12a and 13a in the form of an ellipse as viewed from the front side and a dish in cross section. The front regions of the protrusions 12a and 13a in the form of a dish in cross section are forwardly convex. Also, wide-based flared regions 12b and 13b are respectively formed around the dish-like protrusions 12a and 13a. Since the degree of longitudinal unevenness in this case is greater than that in a case where the dish-like region 12a is simply protruded forward, the sectional secondary moment becomes greater, which offers excellent resistance to bending, twisting, compression and the like. Since the front lens 11 has such a greater degree of unevenness, the surface area of the front lens 11 is increased. This decreases the quantity of heat transmitted per unit area, thus offering excellent heat radiation properties. The front lens 11 is made of a material superior in heat resistance.

Reference numeral 18 denotes an extension positioned so as to surround the projecting lamp 30. The surface of the extension is mirrored. The provision of the extension 18 allows the entire light chamber to look like a mirror surface in color, that is, its appearance is similar to that of the reflector 22 of the reflecting lamp 20, thus making the whole headlamp appear bright and attractive.

Although two cutouts 82 are provided for the vertical walls 80 in the embodiment described above, the number of cutouts is not limited to two but may be as many as desired in order to match the number of flanges on the leveling device side.

A description has been given of an embodiment of the present invention in the form of a movable-reflector type vehicular headlamp in which the reference and pivotally moving members are a lamp body and a reflector, respectively. However, the present invention is needless to say applicable to a movable-unit type headlamp in which the reference and pivotally moving members are a lamp housing and a lamp body and reflector unit, respectively.

As set forth above, the vertical walls surrounding the holder in the leveling device obviously prevent objects from directly bumping into the leveling device, thus protecting the leveling device from damage.

Further, since the flanges of the holders engage the vertical walls in their peripheral directions when the leveling device is fitted to the headlamp, the leveling device is automatically positioned in the peripheral direction. The fitting of the leveling device is thus facilitated.

What is claimed is:

1. A vehicular headlamp in which a lateral illumination angle is adjustable, the headlamp comprising:

a reference member comprising a lamp body, said lamp body having a rear wall and including an externally projecting portion unitarily formed on said rear wall and extending in a rearward direction opposite a direction in which light is illuminated from said headlamp, said externally projecting portion having a holder fitting hole;

an inclination member having a light reflecting surface for setting an illumination direction of the headlamp, said inclination member being pivotally movable along a vertical axis with respect to said reference member; and a leveling device disposed between said inclination member and said reference member, said leveling device measuring an amount of lateral inclination of said inclination member with respect to said reference member, said leveling device comprising:

a holder member fixedly fitted into and extending through said holder fitting hole of said reference member, said holder member comprising at least one flange fixedly engaging said externally projecting portion of said reference member so as to be immovably retained thereby; and a sliding rod slidably fitted in said holder member, said rod having a leading end extending forward from said holder member, said sliding rod being urged into abutment with said inclination member.

2. The vehicular headlamp according to claim 1, wherein said headlamp is a movable-reflector type headlamp, in which said reference member is a lamp body and said inclination member is a reflector.

3. The vehicular headlamp according to claim 1, wherein said headlamp comprises a first reflection type lamp and a second projection type lamp, and said headlamp is a movable-reflector type headlamp wherein said reference member is a lamp body and said inclination member is an attachment member integrally attached to said first and second lamps.

4. The vehicular headlamp according to claim 1, wherein said headlamp is a movable-unit type headlamp in which said reference member is a lamp housing formed on a vehicle and said inclination member is a lamp unit which is integrally constructed of a lamp body and a reflector.

5. The vehicular headlamp according to claim 1, wherein said holder member comprises a first holder fixedly fitted into said tubular externally projecting portion integrally formed on said rear wall of said reference member and a second holder threadably engaging said first holder, said second holder being slidable with respect to said first holder by rotating said first holder.

6. The vehicular headlamp according to claim 1, further comprising a compression spring accommodated in said holder member for urging said sliding rod of said leveling device into abutment with said inclination member.

7. The vehicular headlamp according to claim 1, wherein said leveling device is disposed at a position corresponding to a peripheral edge at a corner of a headlamp body of said headlamp.

8. The vehicular headlamp according to claim 1, wherein said reference member further comprises at least one vertical wall continuously extending rearward from said externally projecting portion, said vertical wall being formed at a peripheral edge of said holder fitting hole.

9. The vehicular headlamp according to claim 8, wherein said vertical wall includes opposing cutouts in a periphery thereof, and said flange of said holder member being fitted into said cutout and mated therewith.

10. A vehicular headlamp in which a lateral illumination angle is adjusted, the headlamp comprising:
a reference member comprising a lamp body, said lamp body including an externally projecting portion unitarily formed on a rear wall of said lamp body, said externally projecting portion having a holder fitting hole formed therein, said projecting portion comprising at least one vertical wall continuously extending rearward from said externally projecting portion in a direction opposite a direction light is emitted by said headlamp, said vertical wall being formed at a peripheral edge of said holder fitting hole;
an inclination member having a light reflecting surface for setting an illumination direction of said headlamp, said inclination member being pivotally movable about a vertical axis with respect to said reference member; and
a leveling device disposed between said inclination member and said reference member, said leveling device measuring an amount of lateral inclination of said inclination member with respect to said reference member, said leveling device comprising:
a holder member fixedly fitted into and extending through said holder fitting hole of said reference member, said holder member engaging said externally projecting portion of said reference member so as to be immovable with respect thereto, said holder member being surrounded by said vertical wall of said reference member; and
a sliding rod slidably fitted in said holder member, said rod having a leading end extending forward from said holder member, said sliding rod being urged into abutment with said inclination member.

11. The vehicular headlamp according to claim 10, wherein said headlamp is a movable-reflector type headlamp in which said reference member is a lamp body and said inclination member is a reflector.

12. The vehicular headlamp according to claim 10, wherein said headlamp comprises a first reflection type lamp and a second projection type lamp, and wherein said headlamp is a movable-reflector type headlamp wherein said reference member is a lamp body and said inclination member is an attachment member integrally attached to said first and second lamps.

13. The vehicular headlamp according to claim 10, wherein said headlamp is a movable-unit type headlamp in which said reference member is a lamp housing formed on a vehicle and said inclination member is a lamp unit which is integrally constructed of a lamp body and a reflector.

14. The vehicular headlamp according to claim 10, wherein said holder member comprises a first holder fixedly fitted into said tubular externally projecting portion integrally formed on said rear wall of said reference member, and a second holder threadably engaging said first holder, said second holder being slidable with respect to said first holder by rotating said first holder.

15. The vehicular headlamp according to claim 10, further comprising a compression spring accommodated in said holder member for urging said sliding rod of said leveling device into abutment with said inclination member.

16. The vehicular headlamp according to claim 10, wherein said leveling device is disposed at a position corresponding to a peripheral edge at a corner of a headlamp body of said headlamp.

17. The vehicular headlamp according to claim 10, wherein said holder member comprises at least one flange engaging said externally projecting portion of said reference member.

18. The vehicular headlamp according to claim 17, wherein said vertical wall has opposing cutouts in a periphery thereof, said flange of said holder member being fitted into said cutouts and mated therewith.

* * * * *